US012597438B2

(12) United States Patent
Aoki

(10) Patent No.: US 12,597,438 B2
(45) Date of Patent: Apr. 7, 2026

(54) HEAD SUSPENSION ASSEMBLY AND DISK DEVICE

(71) Applicants: Kabushiki Kaisha Toshiba, Tokyo (JP); Toshiba Electronic Devices & Storage Corporation, Tokyo (JP)

(72) Inventor: Kenichiro Aoki, Tokyo (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/955,640

(22) Filed: Nov. 21, 2024

(65) Prior Publication Data

US 2026/0031102 A1     Jan. 29, 2026

(30) Foreign Application Priority Data

Jul. 23, 2024     (JP) ................................. 2024-117920

(51) Int. Cl.
*G11B 5/48* (2006.01)
*G11B 5/00* (2006.01)
(52) U.S. Cl.
CPC .... *G11B 5/4813* (2013.01); *G11B 2005/0021* (2013.01)
(58) Field of Classification Search
None
See application file for complete search history.

(56) References Cited

U.S. PATENT DOCUMENTS

| | | | | |
|---|---|---|---|---|
| 5,838,517 | A * | 11/1998 | Frater | G11B 5/105 |
| 8,248,733 | B1 * | 8/2012 | Radavicius | G11B 21/22 360/254.7 |
| 11,056,137 | B1 * | 7/2021 | Teo | G11B 25/043 |
| 11,854,582 | B2 | 12/2023 | Nishida et al. | |
| 2021/0287701 | A1 * | 9/2021 | Kudo | G11B 5/6088 |
| 2023/0197109 | A1 * | 6/2023 | Nishida | G11B 5/4833 360/245.3 |
| 2023/0326483 | A1 * | 10/2023 | Zhang | G11B 5/4833 360/245.3 |

FOREIGN PATENT DOCUMENTS

| | | |
|---|---|---|
| JP | 2013-251031 A | 12/2013 |
| JP | 5634440 B2 | 12/2014 |
| JP | 2023-92137 A | 7/2023 |

* cited by examiner

*Primary Examiner* — Peter Vincent Agustin
(74) *Attorney, Agent, or Firm* — Kim & Stewart LLP

(57) ABSTRACT

According to one embodiment, a head suspension assembly includes a support plate including a proximal end portion, a distal end portion, a lift tab, and a first opening, a wiring member on the support plate, including a gimbal portion opposed to the distal end portion, and a head including a slider mounted on the gimbal portion, a head element on the slider, and a laser oscillator on the slider, opposed to the first opening. The support plate includes a first protrusion provided on the distal end portion and brought into contact with a central part of the slider via the gimbal portion, and a second protrusion that is provided between the first protrusion and the lift tab and that protrudes toward the gimbal portion.

13 Claims, 11 Drawing Sheets

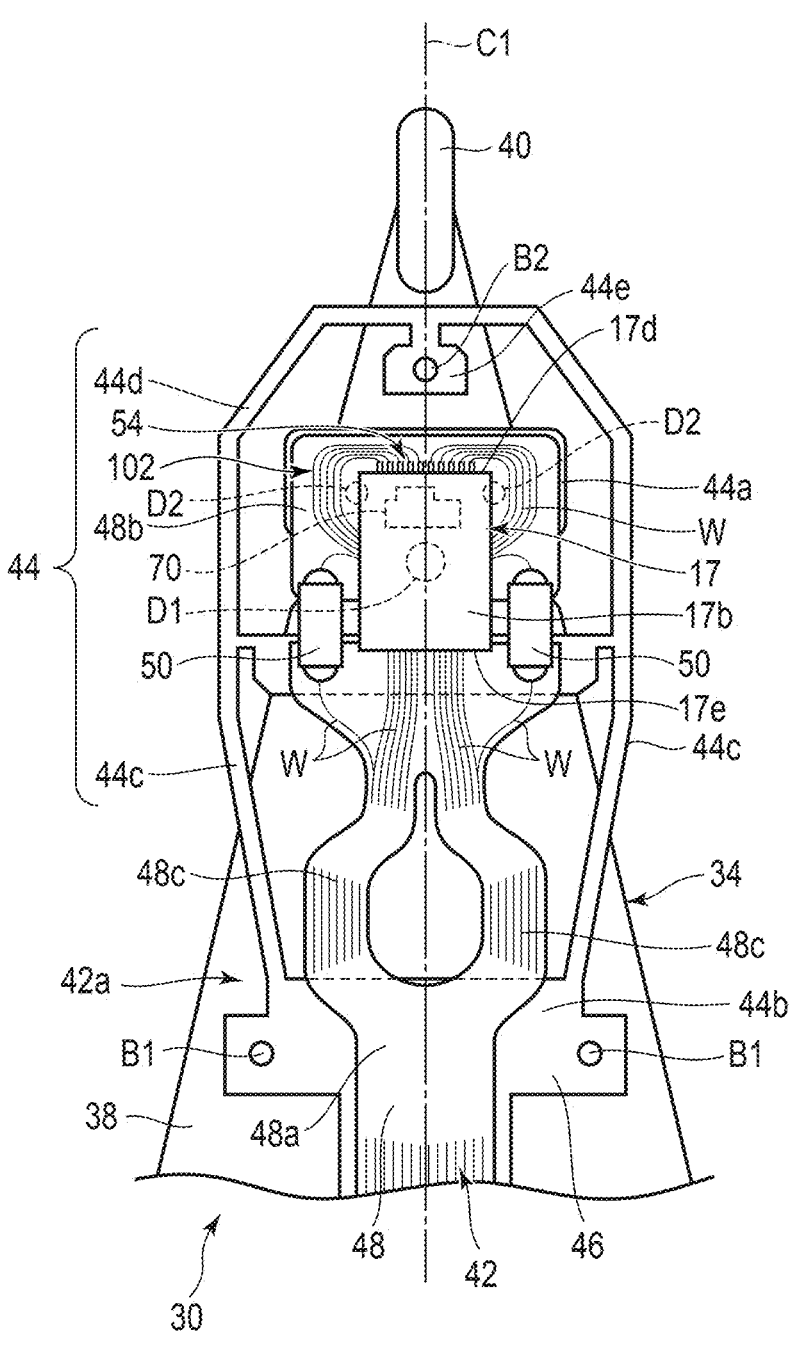
F I G. 10

HEAD SUSPENSION ASSEMBLY AND DISK DEVICE

CROSS-REFERENCE TO RELATED APPLICATIONS

This application is based upon and claims the benefit of priority from Japanese Patent Application No. 2024-117920, filed Jul. 23, 2024, the entire contents of which are incorporated herein by reference.

FIELD

Embodiments described herein relate generally to a head suspension assembly and a disk device comprising the same.

BACKGROUND

A hard disk drive serving as a disk device, for example, comprises a plurality of magnetic disks rotatably provided in a housing, a plurality of magnetic heads reading or writing information from or to the magnetic disks, and a head actuator supporting the magnetic heads so as to be movable with respect to the magnetic heads.

The head actuator has a plurality of head suspension assemblies (often referred to as head gimbal assemblies (HGA)) that support the magnetic heads at distal end portions. The head suspension assembly includes a support plate and a flexure (wiring member) provided on the support plate. The flexure includes a gimbal portion that can be displaced freely, and a magnetic head is mounted on this gimbal portion.

In recent years, a magnetic head of a heat-assisted method that applies laser light to a magnetic disk has been proposed. This magnetic head includes a slider having a head element embedded and a heat-generating element portion, for example, a laser diode unit (LDU), installed on the slider.

In the above-described HDD, if the number of magnetic disks is to be increased, it is necessary to reduce the thickness of the support plates (suspension, load beam, and the like) of the head suspension assembly and to reduce the distance and interval between the support plates. However, if the distance and interval between the support plates is reduced, the LDU may interfere with each other when the magnetic head and LDU vibrate in the pitch direction around the dimple of the support plate due to an external impact or the like.

BRIEF DESCRIPTION OF THE DRAWINGS

FIG. 10 is a plan view showing a distal end portion of a head suspension assembly of HDD according to a second embodiment.

DETAILED DESCRIPTION

Figure 1:
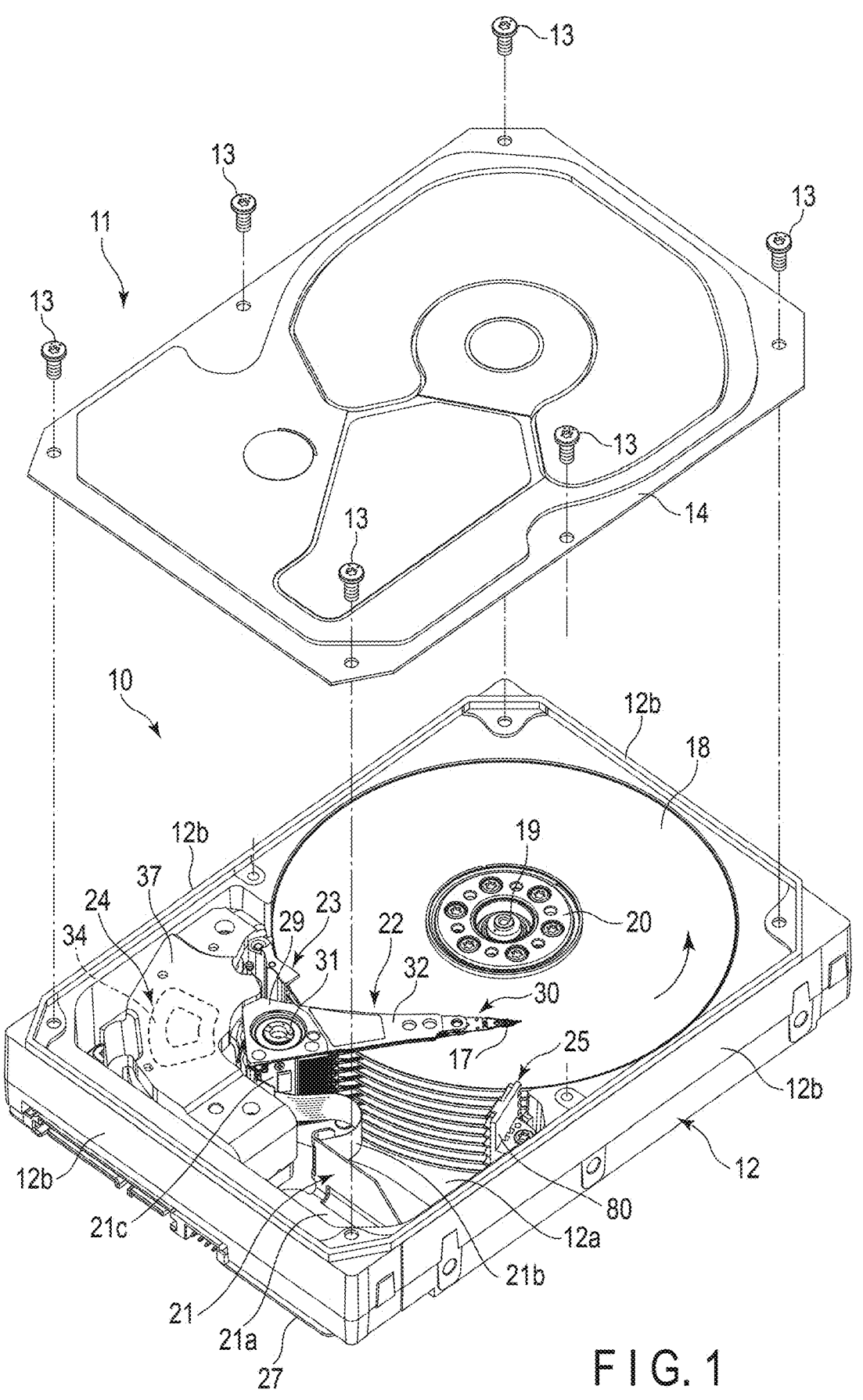
FIG. 1 is a perspective view showing a hard disk drive (HDD) according to the first embodiment, with a top cover removed.

Various embodiments will be described hereinafter with reference to the accompanying drawings. In general, according to one embodiment, a head suspension assembly includes a support plate including a proximal end portion, a distal end portion, a lift tab protruding from the distal end portion, and a first opening provided in the distal end portion, a wiring member including an elastically deformable gimbal portion opposed to the distal end portion of the support plate, and provided on the support plate, and a head including a slider mounted on the gimbal portion, a head element provided on the slider, and a laser oscillator provided on the slider and opposed to the first opening. The support plate includes a first protrusion provided on the distal end portion and brought into contact with a central part of the slider via the gimbal portion, and a second protrusion that is provided between the first protrusion and the lift tab and that protrudes toward the gimbal portion.

The disclosure is merely an example, and proper changes within the spirit of the invention, which are easily conceivable by a person of ordinary skill in the art, are included in the scope of the invention as a matter of course. In addition, in some cases, in order to make the description clearer, the widths, thicknesses, shapes and the like, of the respective parts are schematically illustrated in the drawings, compared to the actual modes. However, the schematic illustration is merely an example, and adds no restriction to the interpretation of the invention. Besides, in the specification and drawings, the same elements as those described in connection with preceding drawings are denoted by like reference numbers, and a detailed description thereof is omitted or simplified unless necessary.

First Embodiment

A hard disk drive (HDD) according to a first embodiment will be described in detail as a disk device.

FIG. 1 is an exploded perspective view showing the HDD according to the first embodiment with a top cover detached.

As shown in FIG. 1, HDD comprises a rectangular housing 10. The housing 10 comprises a base 12 shaped in a rectangular box which is open on its upper side, and a cover (top cover) 14. The base 12 includes a rectangular bottom wall 12a, and a side wall 12b erected along a peripheral edge of the bottom wall 12a and is, for example, formed of aluminum and molded integrally. For example, the cover 14 is formed of stainless steel and shaped in a rectangular plate. The cover 14 is screwed onto the side walls 12b of the base 12 using a plurality of screws 13 to airtightly seal the upper opening of the base 12.

A plurality of, for example, ten magnetic disks 18 serving as disk-shaped recording media, and a spindle motor 19 that supports and rotates the magnetic disks 18, are provided inside the housing 10. The spindle motor 19 is arranged on the bottom wall 12a. Each magnetic disk 18 includes a substrate shaped in a circular disk with a diameter of, for example, 95 mm (3.5 inches) and formed of a non-magnetic material, for example, glass, and magnetic recording layers formed on top and bottom surfaces of the substrate. The magnetic disks 18 are fitted coaxially with a hub of the spindle motor 19 and are further clamped by a clamp spring 20. The ten magnetic disks 18 are thereby arranged at predetermined intervals and supported to be parallel to each other and approximately parallel to the bottom wall 12a. The plurality of magnetic disks 18 are rotated at a predetermined number of revolutions by the spindle motor 19. Incidentally, the number of magnetic disks 18 mounted is not limited to ten, but may be nine or less, or eleven or more.

A plurality of magnetic heads 17 for recording and reproducing information on the magnetic disks 18, and an actuator assembly 22 that supports these magnetic heads 17 in a movable manner with respect to the magnetic disks 18, are provided in the housing 10. In addition, inside the housing 10 are provided a voice coil motor (VCM) 24 that rotates and positions the actuator assembly 22, a ramp load mechanism 25 that holds the magnetic heads 17 in an unloaded position remote from the magnetic disks 18 when the magnetic heads 17 move to the outermost circumference of the magnetic disks 18, a board unit (FPC unit) 21 on which electronic components such as a conversion connector are mounted, and a spoiler 23. The VCM 24 includes a pair of yokes 37 provided on the bottom wall 12a and magnets (not shown) that are fixed to the yokes 37. The ramp load mechanism 25 includes a ramp 80 that is erected on the bottom wall 12a. Incidentally, the actuator assembly 22 and the VCM 24 constitute the head actuator.

A printed circuit board 27 is screwed to the outer surface of the bottom wall 12a of the base 12. The printed circuit board 27 configures a controller that controls the operation of the spindle motor 19 and the operations of the VCM 24 and the magnetic heads 17.

Figure 2:
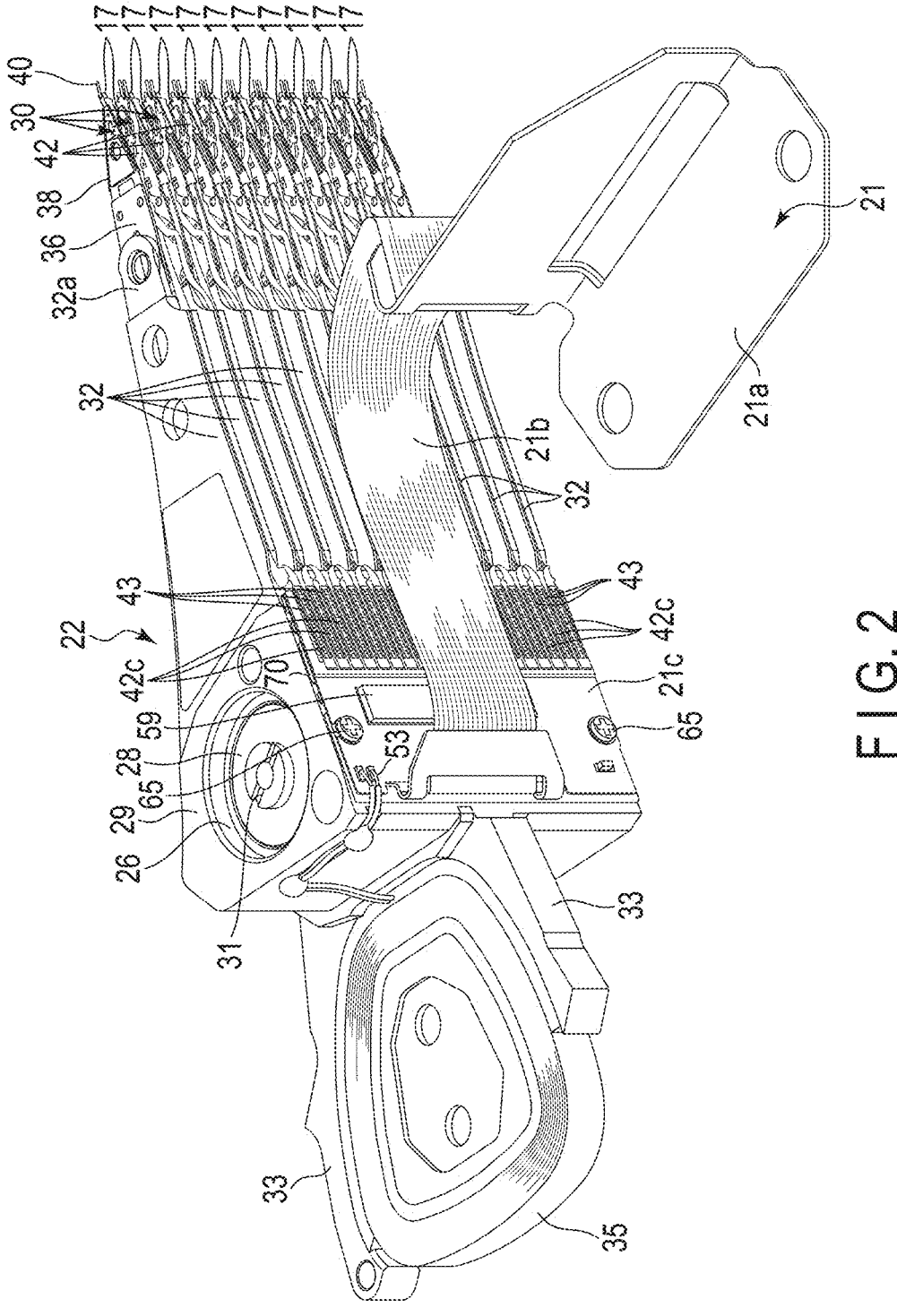
FIG. 2 is a perspective view showing an actuator assembly and a substrate unit of the HDD.

FIG. 2 is a perspective view showing the actuator assembly 22 and the board unit 21. As shown in the figure, the actuator assembly 22 comprises an actuator block 29 having a through hole 26, a bearing unit (unit bearing) 28 provided in the through hole 26, a plurality of, for example, eleven arms 32 extending from the actuator block 29, a head suspension assembly (sometimes referred to as a head gimbal assembly: HGA) 30 attached to each of the arms 32, and a magnetic head 17 supported by the head suspension assembly 30. A support shaft (pivot shaft) 31 is erected on the bottom wall 12a of the base 12. The actuator block 29 is supported by the bearing unit 28, around the support shaft 31, in a rotatable manner.

In the embodiment, the actuator block 29 and eleven arms 32 are formed of aluminum or the like and molded as a single unit. The arms 32 are formed in a shape of, for example, an elongated flat plate and extend from the actuator block 29 in a direction orthogonal to the support shaft 31. Eleven arms 32 are provided parallel to each other and arranged at intervals.

The actuator assembly 22 includes a support frame 33 extending from the actuator block 29 in a direction opposite to the arms 32. The voice coil 35 which constitutes a part of the VCM 24 is supported by the support frame 33. As shown in FIG. 1, the voice coil 35 is located between a pair of yokes 37, and constitutes the VCM 24 together with these yokes 37 and magnets fixed to the yokes.

As shown in FIG. 2, the actuator assembly 22 comprises twenty suspension assemblies 30 each supporting the magnetic head 17. The plurality of head suspension assemblies 30 include an up-head suspension assembly that supports the magnetic head 17 in an upward direction and a down-head suspension assembly that supports the magnetic head 17 in a downward direction. The up-head suspension assembly and the down-head suspension assembly are constituted by arranging the suspension assemblies 30 of the same structure upside down.

In the embodiment, in FIG. 2, the down-head suspension assembly is attached to the uppermost arm 32, and the up-head suspension assembly is attached to the lowermost arm 32. The up-head suspension assembly 30 and the down-head suspension assembly 30 are attached to each of nine middle arms 32.

The head suspension assembly 30 has a substantially rectangular base plate 36, a load beam 38 composed of an elongated leaf spring, and a flexure (wiring member) 42 shaped in an elongated strip. The flexure 42 includes a gimbal portion to be described below, and the magnetic head 17 is mounted on this gimbal portion. A proximal end portion of the base plate 36 is fixed to a distal end portion 32a of the arm 32. A proximal end portion of the load beam 38 overlaps with and is fixed to a distal end portion of the base plate 36. The load beam 38 extends from the base plate 36 and is tapered towards the end of the extension. The load beam 38 generates a spring force (reaction force) that urges the magnetic head 17 towards the surface of the magnetic disk 18. In addition, a lift tab 40 protrudes from the distal end portion of the load beam 38. The lift tab 40 can engage with the above-described ramp 80, and constitutes the ramp load mechanism 25 together with the ramp 80.

As shown in FIG. 2, the FPC unit 21 integrally has a substantially rectangular base portion 21a, an elongated strip-shaped relay portion 21b extending from one side edge of the base portion 21a, and a joint portion 21c provided continuously at the end of extension of the relay portion 21b. The base portion 21a, the relay portion 21b, and the joint portion 21c are formed by a flexible printed circuit board (FPC). Electronic components such as a conversion connector and a plurality of capacitors (not shown) are mounted on the base portion 21a and are electrically connected to wiring lines (not shown).

The joint portion 21c is formed in a rectangular shape with a height and width that are substantially the same as those of the side surface (installation surface) of the actuator block 29. The joint portion 21c is attached to the installation surface of the actuator block 29 via a backing plate formed of aluminum or other material, and is further fixed to the installation surface by means of a fixing screw 65. A plurality of connection pads are provided at the joint portion 21c. For example, one head IC (head amplifier) 59 is mounted at the joint portion 21c, and the head IC 59 is connected to the connection pads and the base portion 21a via wiring lines. Furthermore, a connection pad 53 to which a voice coil 35 is connected is provided at the joint portion 21c.

The flexure 42 of each head suspension assembly 30 has an end portion electrically connected to the magnetic head 17, the other end portion that extends to the actuator block 29 through the side edge of the arm 32, and a connection end portion (tail connection terminal portion) 42c provided at the other end portion. The connection end portion 42c is shaped in an elongated rectangle. A plurality of connection terminals (connection pads) 43 are provided on the connection end portions 42c. These connection pads 43 are connected to the respective wiring lines of the flexures 42. In other words, a plurality of wiring lines of the flexures 42 extend along a substantially full length of the flexures 42, with one-side ends connected electrically to the magnetic heads 17 and the other ends connected to the connection pads 43.

The connection pads 43 are jointed to the connection pad of the joint portion 21*c* and electrically connected to wiring lines of the joint portion 21*c*. Thus, each of twenty magnetic heads 17 of the actuator assembly 22 is each electrically connected to the base portion 21*a* via the wiring line and the connection end portion 42*c* of the flexure 42, and the relay section 21*b* and the joint portion 21*c* of the FPC unit 21.

As shown in FIG. 1, the support shaft 31 is erected substantially parallel to the spindle of the spindle motor 19 in a state in which the actuator assembly 22 is assembled into the base 12. The actuator assembly 22 is supported so as to be rotatable around the support shaft 31, and is rotatable between the unloading position where the magnetic head 17 is unloaded outside the outermost circumference of the magnetic disk 18, and the inner circumference position where the magnetic head 17 is located on the innermost circumference side of the magnetic disk 18. Each magnetic disk 18 is located between two suspension assemblies 30. During the operation of the HDD, the magnetic heads 17 supported by two head suspension assemblies 30 are opposed to the upper and lower surfaces of the magnetic disk 18, respectively.

Figure 3:
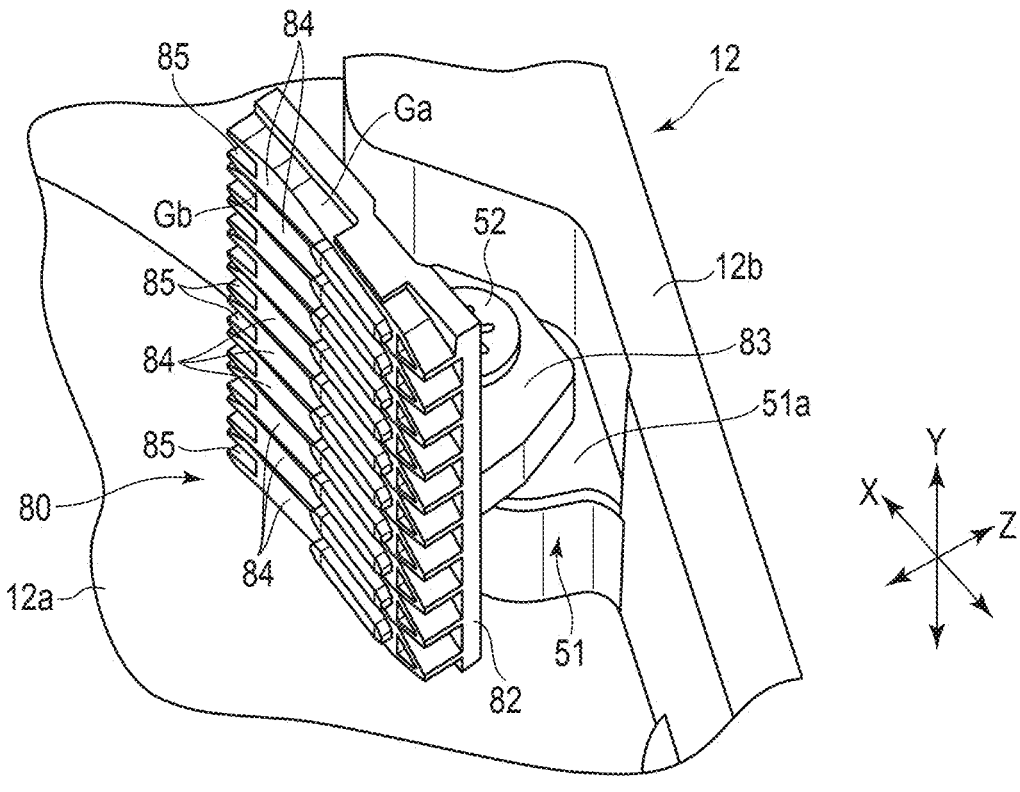
FIG. 3 is a perspective view showing a ramp of the HDD.

FIG. 3 is a perspective view showing a ramp installation portion and the ramp of the base 12 of the HDD.

As shown in FIG. 3, the ramp 80 comprises a ramp body 82 formed in a shape of a rectangular plate, ten guide blocks 84 provided to protrude on one side of the ramp body 82, and a support bracket 83 provided to protrude on the other side of the ramp body 82, which are integrally molded of, for example, synthetic resin. In the figure, the height direction of the ramp 80 is the Y direction, the width direction is the X direction, and the thickness direction is the z direction.

The guide blocks 84 have a shape of an elongated rectangular parallelepiped and extend in the width direction X. Ten guide blocks 84 are arranged at predetermined intervals in the height direction Y, i.e., axial direction of the magnetic disk 18. A rectangular recess (cutout) 85 is formed at one end of each guide block 84 on the magnetic disk 18 side. The recess 85 is formed to extend across the ramp body 82.

Each of the guide blocks 84 has an upper guide surface (first guide surface) Ga that guides and supports the lift tab 40 of the suspension assembly 30 and a lower guide surface (second guide surface) Gb that guides and supports the lift tab 40 of the suspension assembly 30. The upper guide surface Ga and the lower guide surface Gb are opposed to each other and are provided substantially orthogonally to one side of the ramp body 82.

As shown in FIG. 3, the base 12 of the housing 10 includes a ramp installation portion 51 for installing the ramp 80. The ramp installation portion 51 is provided to protrude as a pedestal portion, at the corner of the bottom wall 12*a* and the side wall 12*b* of the base 12. The ramp installation portion 51 has a flat installation surface 51*a*. The installation surface 51*a* is located substantially in the middle of the side wall 12*b* in the height direction and extends substantially parallel to the bottom wall 12*a*.

The support bracket 83 of the ramp 80 is placed on the installation surface 51*a* and is further fixed to the installation surface 51*a* by the fixing screw 52. The ramp body 82 is arranged in a state of being erected substantially orthogonally to the bottom wall 12*a* of the base 12. The guide block 84 is located near the peripheral edge of the corresponding magnetic disk 18.

The outer peripheral portions of ten magnetic disks 18 are located at intervals in the recesses 85 of the corresponding guide blocks, in a state in which the ramp 80 is arranged on the ramp installation portion 51. In addition, the upper guide surfaces Ga and lower guide surfaces Gb of ten guide blocks 84 are positioned in accordance with the heights of the corresponding suspension assemblies 30. Each of the guide surfaces Ga and Gb extends to the vicinity of the outer peripheral edge of the magnetic disk 18, substantially along the radial direction of the magnetic disk 18, and is arranged on the travel path of the lift tab 40.

When the HDD is not in operation and the magnetic head 17 moves from the outer circumference of the magnetic disk 18 to a predetermined unload position, the lift tab 40 of the suspension assembly 30 rides on the corresponding guide surfaces Ga and Gb of the ramp 80. The magnetic heads 17 are thereby held in the unloaded position remote from the magnetic disk 18.

Next, the configuration of the head suspension assembly 30 will be described in detail.

Figure 4:
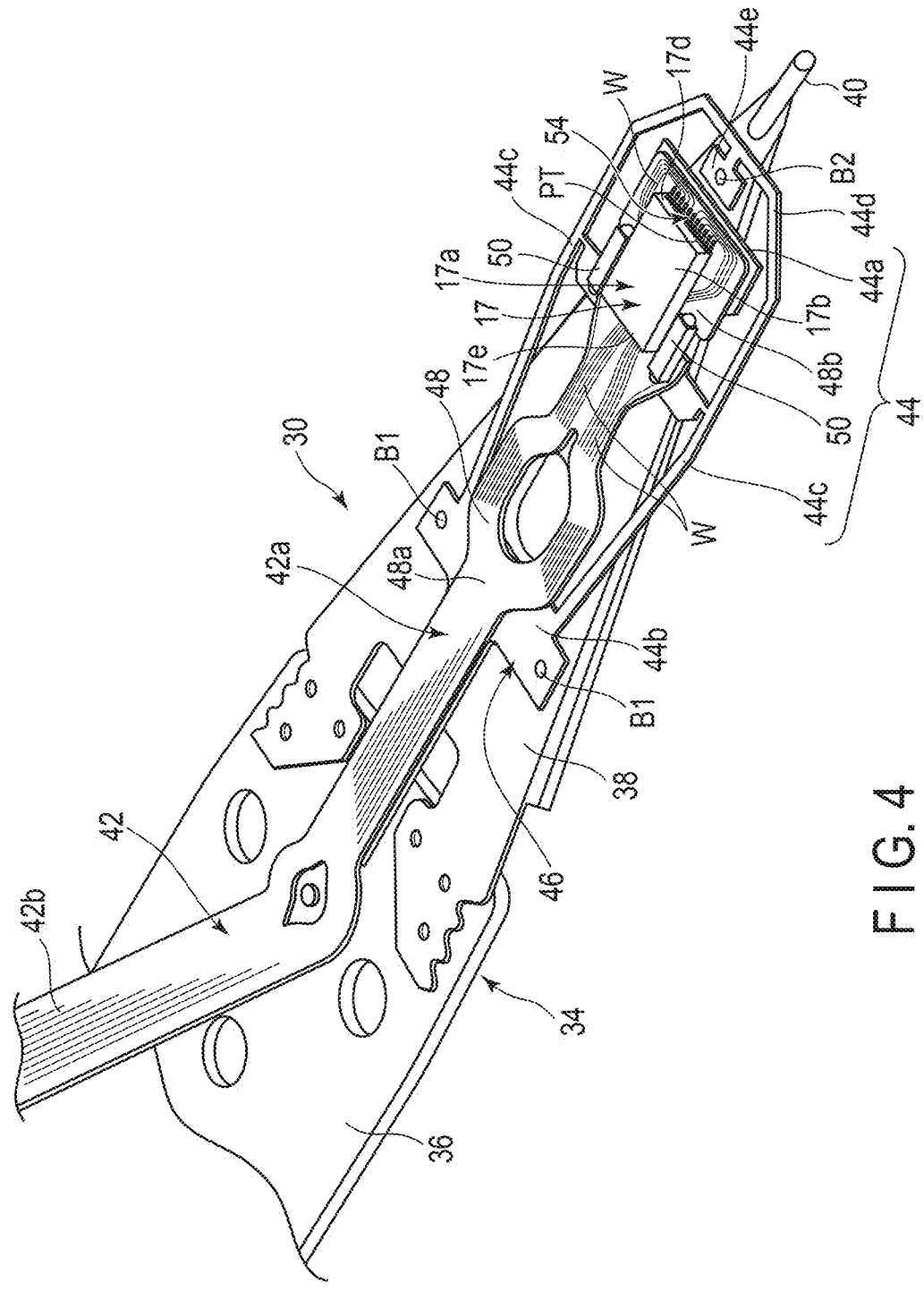
FIG. 4 is a perspective view showing the head suspension assembly of the actuator assembly.
Figure 5:
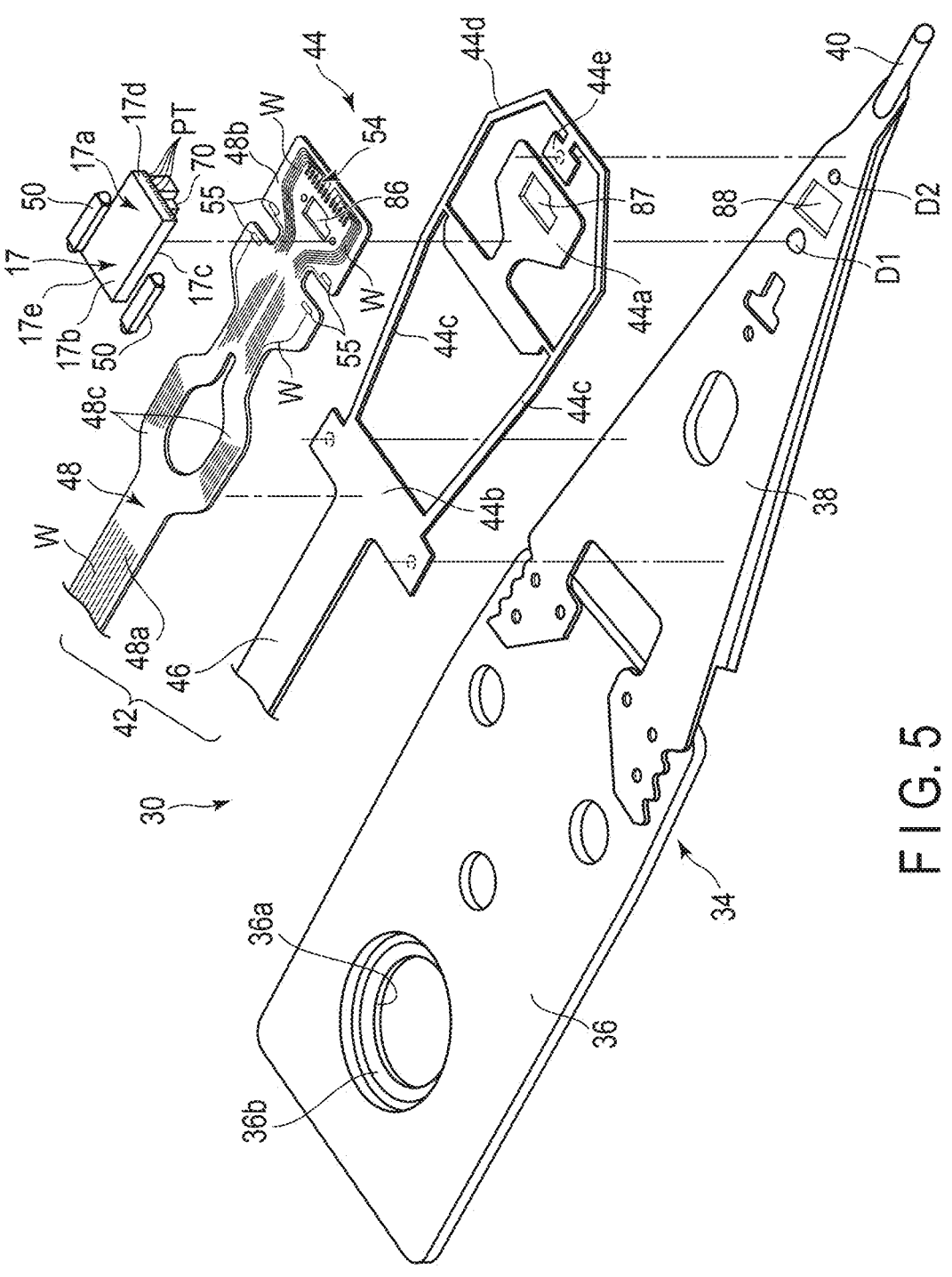
FIG. 5 is an exploded perspective view showing the head suspension assembly.

FIG. 4 is a perspective view showing the magnetic head side of the head suspension assembly, and FIG. 5 is an exploded perspective view showing the head suspension assembly.

As shown in FIG. 4 and FIG. 5, the head suspension assembly 30 includes a suspension 34 that functions as a support plate. The suspension 34 includes a rectangular base plate 36 formed of a metal plate having a thickness of several hundreds of microns and an elongated load beam 38 formed of a metal plate having a thickness of several tens of microns. The load beam 38 is arranged with its base end overlapping with the distal end portion of the base plate 36, and is fixed to the base plate 36 by welding a plurality of parts. The distal end portion of the load beam 38 constitutes the distal end portion of the support plate. A rod-shaped tab (lift tab) 40 is provided to protrude at the distal end portion of the load beam 38.

As shown in FIG. 5, the base plate 36 includes a circular opening 36*a* at its proximal end portion and a circular protrusion 36*b* located around the opening 36*a*. The base plate 36 is fastened to the distal end portion 32*a* of the arm 32 by fitting the projection 36*b* into a circular crimping hole (not shown) formed in a seating surface of the arm 32 and then crimping the projection 36*b*. The proximal end of the base plate 36 may be fixed to the distal end portion 32*a* of the arm 32 by laser welding, spot welding, or bonding.

As shown in FIG. 4 and FIG. 5, the head suspension assembly 30 includes an elongated strip-shaped flexure (wiring member) 42 for transmitting recording signals, reproducing signals, and drive signals, a pair of piezoelectric elements (for example, PZT elements) 50 mounted on the flexure 42, and a magnetic head 17. The flexure 42 includes a distal side portion 42*a* arranged on the load beam 38 and base plate 36, a proximal side portion 42*b* extending outward from the side edge of the base plate 36 and extending to the actuator block 29 along the side edge of the arm 32, and a connection end portion 42*c* (see FIG. 2) provided at the extending end of the proximal side portion 42*b*. The connection end portion 42*c* includes a plurality of electrode pads 43. The connection pads 43 are electrically jointed to the connection terminal of the joint portion 21*c* installed in the actuator block 29 via a wiring line W.

As shown in FIG. 4 and FIG. 5, the distal end portion of the flexure 42 constitutes a gimbal portion 44. The gimbal portion 44 is located on the distal end portion of the load beam 38. The magnetic head 17 is placed and fixed on the gimbal portion 44, and is supported on the load beam 38 via the gimbal portion 44. A pair of piezoelectric elements 50 serving as drive elements are mounted on the gimbal portion 44 and are arranged on both sides of the magnetic head 17.

The flexure 42 includes a metal sheet (base metal plate) 46 formed of stainless steel or the like, which serves as a base, and a strip-shaped stacked layer member (flexible printed circuit board: FPC) 48 affixed or fixed on the metal sheet 46, to form an elongated stacked layer plate. The stacked layer member (FPC) 48 includes a base insulating layer, most of which is fixed to the metal sheet 46, a conductive layer (wiring pattern) formed on the base insulating layer, and a cover insulating layer stacked on the base insulating layer to cover the conductive layer. For example, copper foil is used as the conductive layer, and a plurality of signal lines W, drive lines, connection terminals, and connection pads are formed by patterning this copper foil.

The metal sheet 46 is affixed onto the surface of the load beam 38 and the base plate 36 or subjected to spot welding at a plurality of welding points, at the distal side portion 42a of the flexure 42. In one example, the metal sheet 46 has two welding points B1 welded to the proximal end portion of the load beam 38 and one welding point (second welding point) B2 welded to the distal end portion of the load beam 38.

In the gimbal portion 44, the metal sheet 46 includes a substantially rectangular tongue portion (support portion) 44a located on the distal side, a substantially rectangular proximal end portion 44b located on the proximal side across a space from the tongue portion 44a, a pair of elastically deformable outriggers 44c that connect the proximal end portion 44b with the tongue portion 44a and support the tongue portion 44a so as to be displaced, a connecting frame 44d that extends from one outrigger 44c to the other outrigger 44c around the distal side of the tongue portion 44a, and a substantially rectangular fixed pad portion (second end portion) 44e that extends from the connecting frame 44d and faces the tongue portion 44a. The fixed pad portion 44e is located between the connecting frame 44d and the tongue portion 44a.

The proximal end portion 44b is affixed to the surface of the load beam 38 and spot-welded to the load beam 38 at the welding points B1. The fixed pad portion 44e is spot-welded to the distal end portion of the load beam 38 at a welding point B2. The welding point B2 is located on a center axis C1 of the suspension 34 (see FIG. 6).

Figure 6:
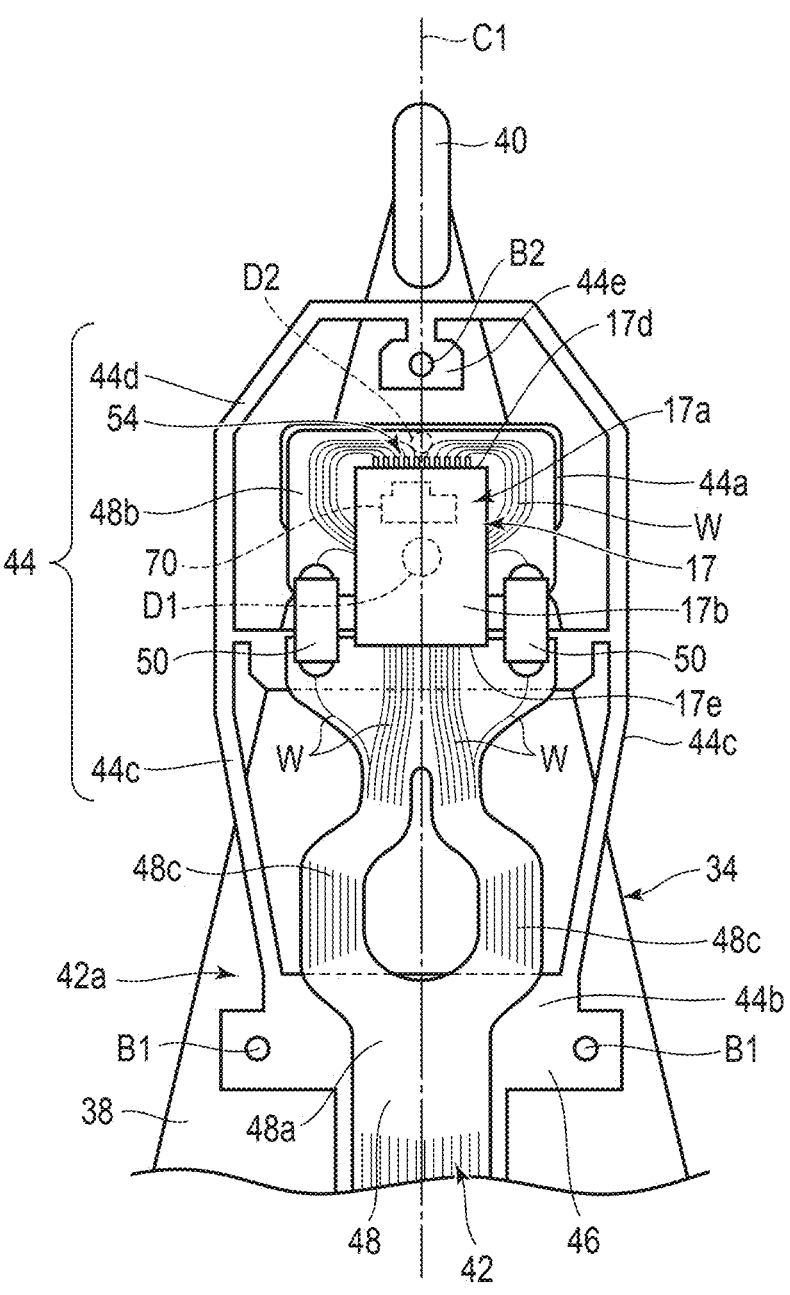
FIG. 6 is a plan view showing a distal end portion of the head suspension assembly.

FIG. 6 is a plan view showing the distal end portion of the head suspension assembly.

As shown in FIG. 4, FIG. 5, and FIG. 6, the tongue portion 44a is formed to have a size and a shape which allow the magnetic head 17 to be placed thereon, and is formed in, for example, a substantially rectangular shape. The tongue portion 44a is arranged such that the central axis in its width direction corresponds to the central axis C1 of the suspension 34. A rear end portion of the tongue portion 44a, which is located on the side of the proximal end portion 44b, is connected to the outriggers 44c. A substantially central portion of the tongue portion 44a is in contact with a dimple (first projection) D1 provided to protrude at the distal end portion of the load beam 38. The pair of outriggers 44c and the connecting frame 44d are elastically deformed. The tongue portion 44a can be thereby displaced in various directions with the dimple D1 serving as the fulcrum. As a result, the tongue portion 44a and the magnetic head 17 mounted on the tongue portion 44a can be displaced in the rolling direction or the pitch direction while flexibly following the surface fluctuation of the magnetic disk 18, and can maintain a narrow gap between the surface of the magnetic disk 16 and the magnetic head 17.

In the gimbal portion 44, the stacked layer member 48 of the flexure 42 is arranged on the metal plate 46 and extends from the proximal end portion 44b to an upper part of the tongue portion 44a. In other words, the stacked layer member 48 includes a proximal end portion 48a affixed onto the proximal end portion 44b, a distal end portion 48b affixed to the tongue portion 44a, and a pair of strip-shaped bridge portions 48c extending in a bifurcating manner from the proximal end portion 48a to the distal end portion 48b. The distal end portion 48b constitutes the head installation area where the magnetic head 17 is mounted.

A plurality of connection terminals 54 are aligned in the width direction on the distal end portion 48b. In addition, a plurality of connection pads (electrode pads) 55 for connecting the piezoelectric elements 50 are provided on the distal end portion 48b. The stacked layer member 48 includes a plurality of signal lines W extending from the connection terminals 54 to the proximal end portion 48a side, and a plurality of drive lines W extending from the connection pads 55 to the proximal end portion 48a side. These signal lines W and drive lines W extend over substantially the entire length of the stacked layer member 48 and are connected to the connection pads 43 of the connection end portion 42c.

As shown in FIG. 5, a substantially rectangular through hole 86 is provided in the center of the distal end portion 48b, particularly in the area where the signal lines W are not present. A substantially rectangular through hole 87 is formed in the center of the tongue 44a. The through hole 87 has substantially the same shape and dimensions as the aperture 86, and is positioned to face the aperture 86. Furthermore, a substantially rectangular through hole (often referred to as a first opening) 88 is formed at a distal end portion of the load beam 38. The through hole 88 has substantially the same dimensions as the through hole 87 or larger dimensions than the through hole 87, and is located to face the through holes 86 and 87. As described later, a laser oscillator element is inserted through the through holes 86, 87, and 88.

Figure 7:
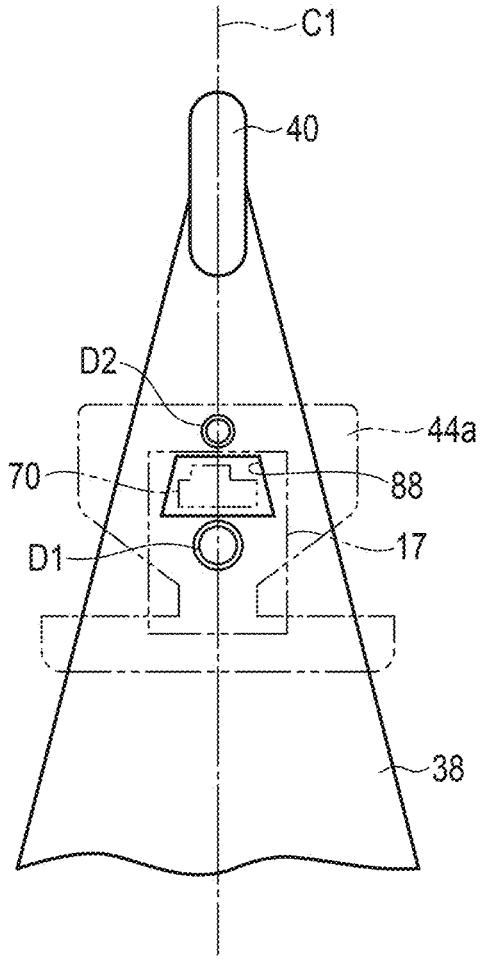
FIG. 7 is a plan view showing a distal end portion of a load beam.

FIG. 7 is a plan view showing a distal end portion of the load beam 38.

As shown in FIG. 5 and FIG. 7, the load beam 38 includes a dimple (first protrusion) D1, a through hole 88, and a second dimple (second protrusion) D2, which are provided at the distal end portion. The dimple D1 is provided in a position that can be brought into contact with a substantially central part of the magnetic head 17, on the central axis C1. The through hole 88 is provided on the distal end side of the load beam 38, i.e., the side of the lift tab 40, with respect to the dimple D1, and is provided at a position opposite to the through hole 87 of the tongue portion 44a. The second dimple D2 is provided on a distal end side of the load beam 38, i.e., a side of a lift tab 40, with respect to a dimple D1, and is provided at a position opposite to a tongue portion 44a. In the embodiment, the second dimple D2 is provided on the central axis C1 and is further provided on the distal end side of the load beam 38, i.e., the side of the lift tab 40, with respect to the through hole 88. The dimple D1, the through hole 88, and the second dimple D2 are provided in a line on the central axis C1.

Figure 8:
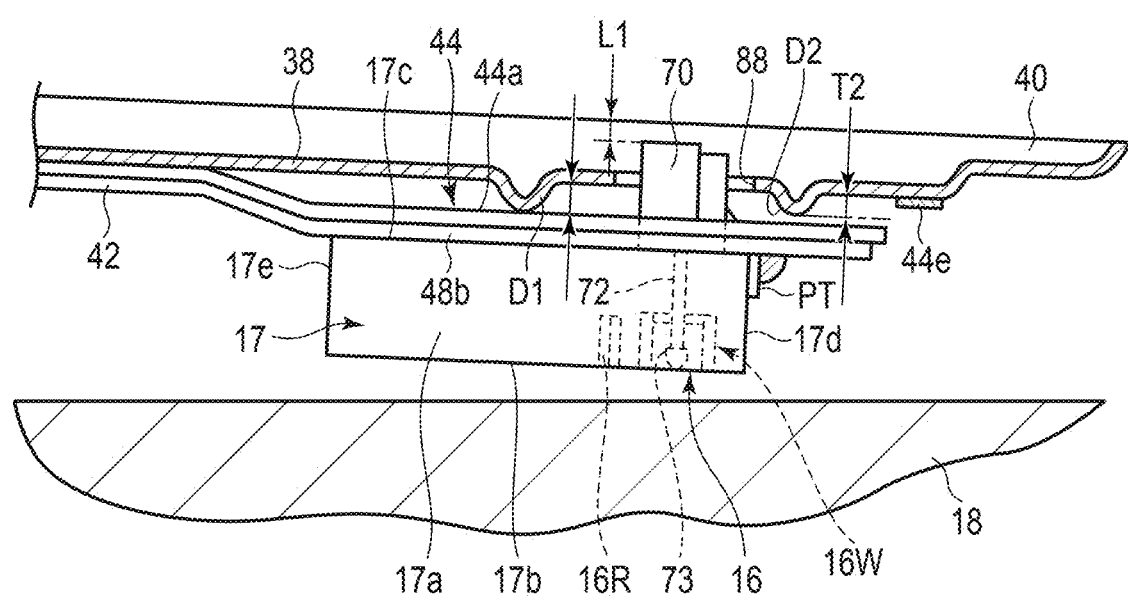
FIG. 8 is a side view schematically showing the distal end portion of the head suspension assembly, and parts of the magnetic head and the magnetic disk.

FIG. 8 is a side view schematically showing the gimbal portion 44 and the magnetic head of the head suspension assembly, and a part of the magnetic disk.

As shown in FIG. 8, the magnetic head 17 includes a slider 17a having a shape of a substantially flat rectangular parallelepiped and a head portion 16 provided on the slider 17a. The head portion 16 includes a recording element (write head) 16W and a read element (read head) 16R. The slider 17a includes an air bearing surface (ABS) 17b that faces the surface of the magnetic disk 18, a back surface 17c on an opposite side, an outlet end 17d located on the distal end side of the load beam 38, and an inlet end 17e located on the proximal end side of the load beam 38. The magnetic head 17 is placed on the tongue portion 44a while overlapping with the distal end portion 48b in a state in which a back surface 17c of the slider 17a faces the distal end portion 48b, and is fixed to the tongue portion 44a with adhesive.

As shown in FIG. 6, the magnetic head 17 is arranged in a position where the center axis of the longitudinal direction is aligned with the center axis C1 of the head suspension assembly 30.

As shown in FIG. 5 and FIG. 8, the magnetic head 17 includes a plurality of connection pads PT provided on the outlet end 17d of the head slider 17a. These connection pads PT are electrically connected to the head portion (recording element, read element, heater, and the like) 16 of the magnetic heads 17. As described later, each connection pad PT is soldered to the connection terminal 54 of the flexure 42.

The magnetic head 17 further comprises a semiconductor laser, for example, a laser diode unit (LDU) 70, which functions as a heat-assisted element, a heat-generating element, or a laser oscillator, a waveguide 72 that guides the laser beam oscillated from the LDU 70 to the magnetic disks 18, and a near-field optical element 73 that emits the laser beam onto the magnetic disk 18.

The LDU 70 is installed on the back surface 17b of the slider 17a. The LDU 70 extends from the back surface 17b in a substantially orthogonal direction. A connection pad (not shown) of the LDU 70 is soldered to the connection terminal 54 of the flexure 42. In a state in which the magnetic head 17 is fixed to the tongue portion 44a, the LDU 70 is inserted through the through hole 86 of the distal end portion 48b and the through hole 87 of the tongue portion 44a, and the distal end portion is further inserted through the through hole 88. The LDU 70 and the load beam 38 are formed to have a height or thickness that produces an interval L1 between an extension end of the LDU 70 and the side edge of the load beam 38 in a direction orthogonal to the back surface 17c of the slider 17a. In one example, the interval L1 is set to approximately 0.05 mm.

The waveguide 72 and the near-field optical element 73 are provided in the slider 17a. The laser beam generated by the LDU 70 is input to the waveguide 72, propagated to the near-field optical element 73 through the waveguide 72, and emitted from the near-field optical element 73 onto the surface of the magnetic disk 18.

In the embodiment, as shown in FIG. 8, the first and second protrusions are formed of hollow dimples D1 and D2 that are formed by making a part of the load beam 38 protrude. In one example, the protrusion height T1 of the dimple D1 from the surface of the load beam 38 is set to 0.06 mm, and the protrusion height T2 of the second dimple D2 from the surface of the load beam 38 is set to 0.03 mm.

Incidentally, the protrusion height of the dimple is not limited to that in the above-described example, but can be variously changed. For example, the protrusion height T2 of the second dimple D2 can be set to a height lower than T1, and at approximately 30 to 70% of T1. Furthermore, the protrusion height T2 of the second dimple D2 is set to a height such that the distal end portion of the LDU 70 does not protrude beyond the side edge of the load beam 38 when the magnetic head 17 and the tongue portion 44a vibrate in the pitch direction. In other words, the protrusion height T2 of the second dimple D2 is set such that relationship (T1−T2)<L1 is satisfied.

The first protrusion D1 and the second protrusion D2 may be composed of not hollow dimples, but solid protrusions. In addition, the first protrusion D1 and second protrusion D2 may not have circular cross-sections, but may have other cross-sectional shapes.

As described above, the dimple D1 is in contact with a substantially central part of the the magnetic head 17 via the tongue portion 44a. The magnetic head 17 and the tongue portion 44a can thereby pivot in the pitch direction, the roll direction, or the other direction with the dimple D1 serving as a fulcrum. In contrast, the second dimple D2 is positioned to be opposite to the tongue portion 44a at an interval in the normal operating state of the HDD.

Figure 9:
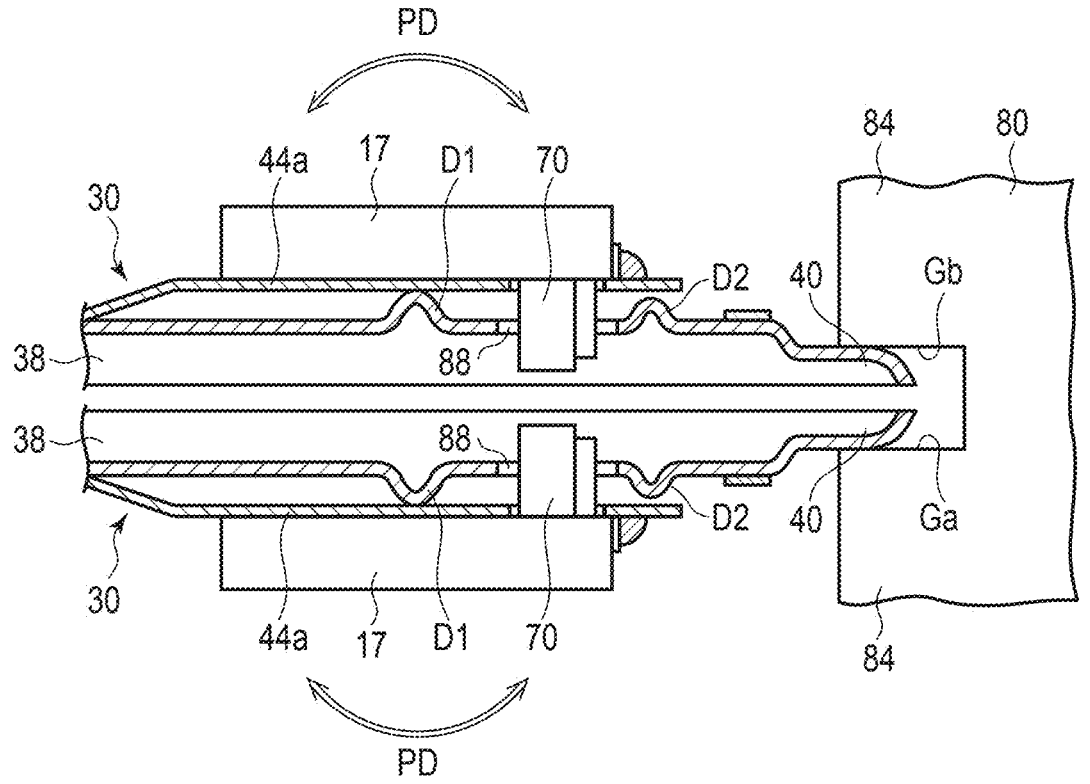
FIG. 9 is a view schematically showing a state in which two head suspension assemblies are held by the ramp in a non-operating state.

FIG. 9 is a side view schematically showing two head suspension assemblies 30 held in the unloaded position and a part of the ramp 80, in the non-operating state of the HDD. In the unloaded position, the lift tabs 40 of the head suspension assemblies 30 ride up on the guide surfaces Ga and Gb of the ramp 80 and are held on the guide surfaces. Back surfaces of two head suspension assemblies 30 are opposed to each other at a small interval.

In the unloaded state shown in FIG. 9, when an external shock or the like acts on the HDD, vibration in the pitch direction PD centered on the dimple D1 may occur in the magnetic head 17 and the tangent portion 44a. In accordance with the vibration in the pitch direction PD, one LDU 70 is displaced in the direction of approaching the other LDU 70.

According to the head suspension assembly 30 of the embodiment, the second dimple D2 is provided on the distal end side of the load beam 38 with respect to the dimple D1 in order to prevent contact and buffering between the LDU. The protrusion height of the second dimple D2 is set to approximately 30 to 70% of the protrusion height of the dimple D1. According to the above-described configuration, when the tongue portion 44a and the magnetic head 17 are vibrated in the pitch direction PD, the tongue portion 44a is brought into contact with the second dimple D2 to suppress an excessive vibration in the pitch direction PD. For example, if the protrusion height of the dimple D1 is 0.06 mm and the protrusion height of the dimple D2 is 0.03 mm, the vibration in the pitch direction can be suppressed to approximately 0.03 mm obtained by subtracting the protrusion height of the dimple D2, i.e., 0.03 mm from the protrusion height of the dimple D1, i.e., 0.06 mm. It is thereby possible to suppress the height fluctuation of the LDU 70 caused by the pitch vibration to approximately 0.03 mm (<L1) and to prevent contact and interference between the LDU 70.

According to the head suspension assembly and HDD configured as described above, contact and interference between the LDU 70 can be prevented in a simple structure in which the second protrusion (second dimple D2) is only provided on the suspension (load beam). In other words, even if the number of magnetic disks is increased and the interval between the head suspension assemblies is reduced, it is possible to avoid the interference and collision between the heat-generating elements (laser oscillator portions) and improve reliability.

Based on the above, according to the first embodiment, it is possible to obtain the head suspension assembly and the disk device capable of avoiding interference between the heat-generating elements in a simple structure even when the number of magnetic disks is increased.

Next, a head suspension assembly of HDD according to another embodiment will be described. In another embodiment described below, the same portions as those of the above-described first embodiment will be denoted by the same reference numeral, their detailed descriptions will be omitted or simplified, and only portions different from the first embodiment will be mainly described in detail.

Second Embodiment

Figure 11:
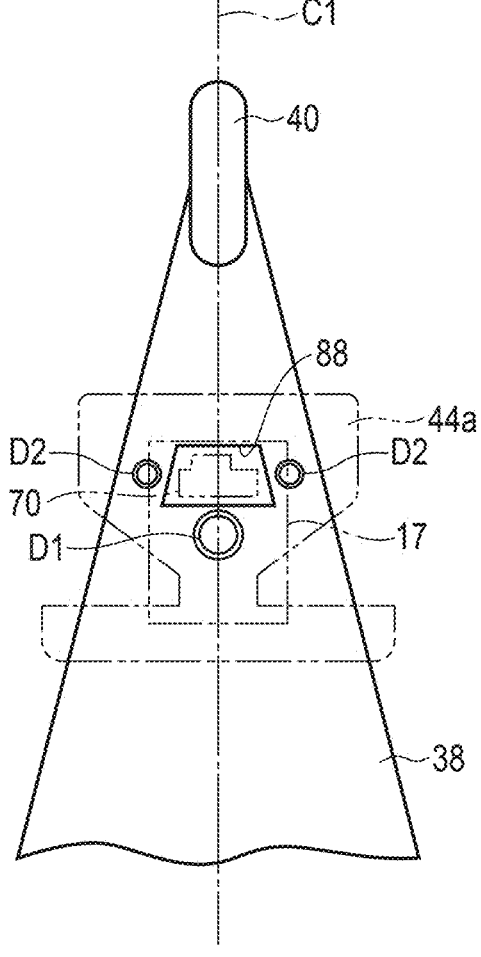
FIG. 11 is a plan view showing a distal end portion of a load beam of the HDD according to the second embodiment.
Figure 12:
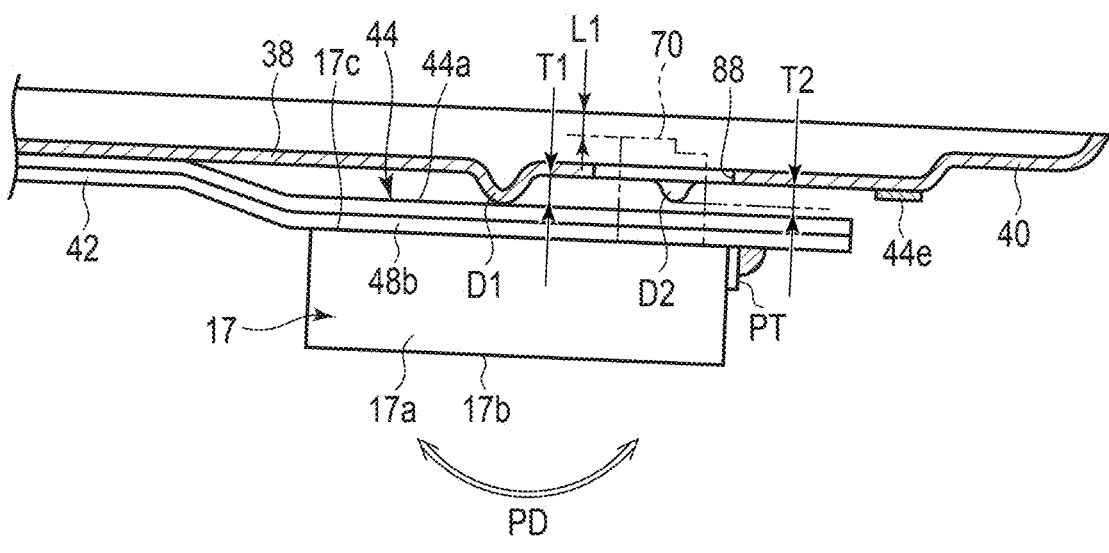
FIG. 12 is a side view schematically showing the distal end portion of the load beam and the magnetic head, with their parts broken.

IG. 10 is a plan view showing a distal end portion of a head suspension assembly of HDD according to the second embodiment, and FIG. 11 is a plan view showing a distal end portion of a load beam of the HDD according to the second embodiment. FIG. 12 is a side view schematically showing the distal end portion of the load beam and the magnetic head with their parts broken, and FIG. 13 is a front view schematically showing the distal end portion of the load beam and the magnetic head.

According to the second embodiment, as shown in FIG. 10 and FIG. 11, a head suspension assembly 30 includes a plurality of, for example, two second dimples (second protrusions) D2. The second dimples D2 are provided on a load beam 38. The second dimple D2 is provided on a distal end side of the load beam 38, i.e., a side of a lift tab 40, with respect to a dimple D1, and is provided at a position opposite to a tongue portion 44a. Two second dimples D2 are provided on both sides of a central axis C1 and are spaced apart from the central axis C1 in a direction perpendicular to the central axis C1. In the embodiment, the two second dimples D2 are located on both sides of a through hole (first opening) 88 in a width direction. The two second dimples D2 are arranged at laterally symmetrical positions with respect to the center axis C1.

Figure 13:
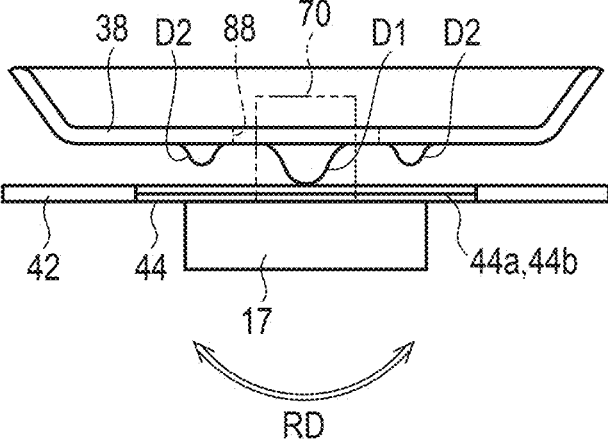
FIG. 13 is a front view schematically showing the distal end portion of the load beam and the magnetic head.

According to the embodiment, as shown in FIG. 12 and FIG. 13, each of the second protrusions is composed of the hollow second dimple D2 formed by making a part of the load beam 38 protrude. A protrusion height T2 of the second dimple D2 from the surface of the load beam 38 is lower than a protrusion height T1 of the dimple D1, and can be set to a height of approximately 30 to 70% of T1. Furthermore, the protrusion height T2 of the second dimple D2 is set to a height such that a distal end portion of LDU 70 does not protrude beyond a side edge of the load beam 38 when a magnetic head 17 and the tongue portion 44a are vibrated in a pitch direction. In other words, the protrusion height T2 is set such that relationship (T1−T2)<L1 is satisfied.

In one example, the protrusion height T1 of the dimple D1 is set to 0.06 mm, the protrusion height T2 of the dimple D2 is set to 0.03 mm, and the interval L1 is set to 0.05 mm.

The first protrusion D1 and the second protrusion D2 may be composed of not hollow dimples, but solid protrusions. In addition, the first protrusion D1 and second protrusion D2 may not have circular cross-sections, but may have other cross-sectional shapes.

According to the second embodiment as described above, the same advantages as those of the above-described first embodiment can be obtained. In other words, according to the above-described configuration, when the tongue portion 44a and the magnetic head 17 are vibrated in the pitch direction PD, the tongue portion 44a is brought into contact with the two second dimples D2 to suppress an excessive vibration in the pitch direction PD. For example, if the protrusion height of the dimple D1 is 0.06 mm and the protrusion height of the dimple D2 is 0.03 mm, the vibration in the pitch direction PD can be suppressed to approximately 0.03 mm. It is thereby possible to suppress the height fluctuation of the LDU 70 caused by the pitch vibration to approximately 0.03 mm (<L1) and to prevent contact and interference between the LDU 70.

According to the second embodiment, two second protrusions D2 are provided on both sides of the central axis C1. For this reason, as shown in FIG. 13, when the tongue portion 44a and the magnetic head 17 are vibrated in the roll direction RD, one of the second projections D2 is brought into contact with the tongue portion 44a and excessive vibration in the pitch direction RD can be suppressed. It is thereby possible to avoid contact and interference between the LDU 70 and the load beam 38, and to improve the reliability.

Based on the above, according to the second embodiment, it is possible to obtain the head suspension assembly and the disk device capable of avoiding interference between the heat-generating elements in a simple structure.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the second embodiment, the two second protrusions D2 may be arranged on both sides of the central axis C1, and may not be laterally symmetrical with respect to the central axis C1. In addition, the two second protrusions D2 may not be formed to have the same protrusion height, but may be formed to have different protrusion heights. The materials, shapes, dimensions, and the like of elements which constitute the head suspension assembly are not limited to those in the above-described embodiments, and can be changed variously as needed.

What is claimed is:

1. A head suspension assembly comprising:
   a support plate including a proximal end portion, a distal end portion, a lift tab protruding from the distal end portion, and a first opening provided in the distal end portion;
   a wiring member provided on the support plate and including an elastically deformable gimbal portion opposed to the distal end portion of the support plate; and
   a head comprising a slider mounted on the gimbal portion, a head element provided at the slider, and a laser oscillator provided on the slider and opposed to the first opening, wherein
   the support plate includes a first protrusion provided on the distal end portion and brought into contact with a central part of the slider via the gimbal portion, and a second protrusion that is provided between the first protrusion and the lift tab and that protrudes toward the gimbal portion, the first opening and the laser oscillator being provided between the first protrusion and the second protrusion.

2. The head suspension assembly of claim 1, wherein a protrusion height T2 of the second protrusion is lower than a protrusion height T1 of the first protrusion.

3. The head suspension assembly of claim 2, wherein the protrusion height of the first protrusion is 0.06 mm and the protrusion height of the second protrusion is 0.03 mm.

4. The head suspension assembly of claim 1, wherein the support plate has a central axis extending from the proximal end portion to the distal end portion, and the first protrusion, the first opening, and the second protrusion are provided on the central axis.

5. The head suspension assembly of claim 2, wherein the protrusion height T2 of the second protrusion is set such that relationship (T1–T2)<L1 is satisfied, where L1 is an interval between an end of the laser oscillator and a side edge of the support plate in a direction perpendicular to a surface of the slider.

6. A disk drive comprising:

a disk-shaped recording medium; and the head suspension assembly of claim 1.

7. The disk drive of claim 6, further comprising:

a ramp configured to hold the lift tab of the head suspension assembly.

8. The disk drive of claim 6, wherein a protrusion height of the second protrusions is lower than a protrusion height of the first protrusion.

9. A head suspension assembly comprising:

a support plate including a proximal end portion, a distal end portion, a lift tab protruding from the distal end portion, and a first opening provided in the distal end portion;

a wiring member provided on the support plate and including an elastically deformable gimbal portion opposed to the distal end portion of the support plate; and a head comprising a slider mounted on the gimbal portion, a head element provided at the slider, and a laser oscillator provided on the slider and opposed to the first opening, wherein the support plate includes a first protrusion provided on the distal end portion and brought into contact with a central part of the slider via the gimbal portion and two second protrusions that are provided between the first protrusion and the lift tab and that protrude toward the gimbal portion, and the support plate has a central axis extending from the proximal end portion to the distal end portion, and the two second protrusions are provided on both sides of the central axis and apart from the central axis.

10. The head suspension assembly of claim 9, wherein the two second protrusions are provided at positions symmetrical with respect to the central axis.

11. The head suspension assembly of claim 10, wherein the first opening is provided on the central axis, and the two second protrusions are provided on both sides of the first opening.

12. The head suspension assembly of claim 9, wherein a protrusion height of the second protrusions is lower than a protrusion height of the first protrusion.

13. A disk drive comprising:

a disk-shaped recording medium; and a head suspension assembly, comprising:

a support plate including a proximal end portion, a distal end portion, a lift tab protruding from the distal end portion, and a first opening provided in the distal end portion;

a wiring member provided on the support plate and including an elastically deformable gimbal portion opposed to the distal end portion of the support plate; and a head comprising a slider mounted on the gimbal portion, a head element provided at the slider, and a laser oscillator provided on the slider and opposed to the first opening, wherein the support plate includes a first protrusion provided on the distal end portion and brought into contact with a central part of the slider via the gimbal portion and two second protrusions that are provided between the first protrusion and the lift tab and that protrude toward the gimbal portion, and the support plate has a central axis extending from the proximal end portion to the distal end portion, and the two second protrusions are provided on both sides of the central axis and apart from the central axis.

* * * * *